(12) United States Patent
Dhamija et al.

(10) Patent No.: US 12,160,775 B2
(45) Date of Patent: Dec. 3, 2024

(54) TRANSPORT SLICE IDENTIFIER FOR END-TO-END 5G NETWORK SLICING MAPPING

(71) Applicant: RAKUTEN MOBILE, INC., Tokyo (JP)

(72) Inventors: Amit Dhamija, Bengaluru (IN); Praveen Kumar, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/793,286

(22) PCT Filed: May 12, 2022

(86) PCT No.: PCT/US2022/028951
§ 371 (c)(1),
(2) Date: Jul. 15, 2022

(87) PCT Pub. No.: WO2023/219618
PCT Pub. Date: Nov. 16, 2023

(65) Prior Publication Data
US 2024/0179574 A1 May 30, 2024

(51) Int. Cl.
*H04W 28/20* (2009.01)
*H04L 41/0895* (2022.01)
*H04L 41/40* (2022.01)

(52) U.S. Cl.
CPC ......... *H04W 28/20* (2013.01); *H04L 41/0895* (2022.05); *H04L 41/40* (2022.05)

(58) Field of Classification Search
None
See application file for complete search history.

(56) References Cited

U.S. PATENT DOCUMENTS

| 2016/0353367 A1* | 12/2016 | Vrzic | H04W 28/0247 |
| 2018/0332523 A1* | 11/2018 | Faccin | H04W 8/12 |
| 2021/0337461 A1* | 10/2021 | Yang | H04W 88/10 |

OTHER PUBLICATIONS

International Search Report dated Sep. 22, 2022 issued by the International Searching Authority in Application No. PCT/US2022/28951.

Written Opinion dated Sep. 22, 2022 issued by the International Searching Authority in Application No. PCT/US2022/28951.

\* cited by examiner

*Primary Examiner* — Hong S Cho
(74) *Attorney, Agent, or Firm* — Sughrue Mion, PLLC

(57) ABSTRACT

Provided are apparatuses and methods for identifying network slices in a transport network. In an embodiment, the apparatus is configured to receive a slice creation request to create a network slice. The slice creation request includes a global identifier corresponding to the network slice. The apparatus is further configured to search a transport slice mapping database for the global identifier. The apparatus is further configured to generate a transport slice identifier corresponding to the network slice. The apparatus is further configured to add a mapping entry to the transport slice mapping database mapping the global identifier to the transport slice identifier. The apparatus is further configured to add another mapping entry to a transport slice path mapping database mapping the transport slice identifier to a network path assigned to the network slice. The apparatus is further configured to publish the mapping entries to a performance monitoring system.

20 Claims, 7 Drawing Sheets

TRANSPORT SLICE IDENTIFIER FOR END-TO-END 5G NETWORK SLICING MAPPING

TECHNICAL FIELD

The present disclosure relates generally to communication systems, and more particularly to methods and apparatuses for using a transport slice identifier for end-to-end network slicing mapping.

BACKGROUND

Related communication systems, such as wireless communication systems (e.g., 4G, Long Term Evolution (LTE), 5G) may be deployed to provide various telecommunication services such as telephony, video, data, messaging, and broadcasts. In order to meet ever increasing demands for wireless data traffic, network technologies may seek to implement an end-to-end (E2E) system in which all targets are integrated over a network providing access in a wired manner, a wireless manner, or other various schemes. To that end, standardization organizations (e.g., International Telecommunication Union (ITU), Next Generation Mobile Networks (NGMN) Alliance, Third Generation Partnership Project (3GPP), Internet Engineering Task Force (IETF)) may define and/or design system and/or network architectures to implement network technologies that may feature high performance, low latency, and high availability.

One such network technology may involve the adoption of network slicing for radio access networks (RANs) and core networks (CNs) that are interconnected to each other via transport networks (TNs). Under network slicing, network resources and network functions may be bundled into network slices depending on individual services, service level agreements (SLAs), and/or network path routing to be provided by each network slice. That is, a network slice over a communication network may provide customized network services by combining control plane (CP) and user plane (UP) network functions for network services necessary for a particular service over a CN and a RAN.

Related mechanisms for deploying and implementing network slicing functionality across network domains may rely on the use of different network slice subnet management function (NSSMF) devices for each domain. For example, each of the RAN, CN, and TN domains may each independently implement separate NSSMF devices (e.g., RN-NSSMF, CN-NSSMF, and TN-NSSMF, respectively). As such, each domain (e.g., RAN, CN, and TN) may operate independently without awareness of the other domains. As a result, related network slicing mechanisms may be unable to correlate network usage information (e.g., paths, resources, performance) from each of the domains to present an end-to-end view of a network slice.

Thus, there exists a need for further improvements in 5G network slicing technology. Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for identifying network slices in a transport network are disclosed by the present disclosure.

According to an aspect of the disclosure, an apparatus, for identifying network slices in a transport network, includes a memory storage storing computer-executable instructions and a processor communicatively coupled to the memory storage. The processor is configured to execute the computer-executable instructions and cause the apparatus to receive, from a controller, a first slice creation request to create a network slice. The first slice creation request includes a global identifier corresponding to the network slice. The computer-executable instructions further cause the apparatus to search a transport slice mapping database for at least one mapping entry corresponding to the global identifier. The computer-executable instructions further cause the apparatus to generate, based on a determination that the at least one mapping entry was not found, a first transport slice identifier corresponding to the network slice. The computer-executable instructions further cause the apparatus to add a first mapping entry to the transport slice mapping database indicating a first relationship between the global identifier and the first transport slice identifier. The computer-executable instructions further cause the apparatus to add a second mapping entry to a transport slice path mapping database indicating a second relationship between the first transport slice identifier and a first network path identifier of a first network path assigned to the network slice. The computer-executable instructions further cause the apparatus to publish, to a performance monitoring system (PMS), the first mapping entry and the second mapping entry.

According to some embodiments of the disclosure, the computer-executable instructions to generate the first transport slice identifier corresponding to the network slice include further computer-executable instructions to generate the first transport slice identifier based at least on a source address indicated by the first slice creation request, a destination address indicated by the first slice creation request, and network path constraints indicated by the first slice creation request.

According to some embodiments of the disclosure, the computer-executable instructions further cause the apparatus to regenerate the first transport slice identifier based on a determination that at least one of the source address, the destination address, and the network path constraints has changed, to obtain a regenerated first transport slice identifier. The computer-executable instructions further cause the apparatus to update the first mapping entry with the regenerated first transport slice identifier to obtain an updated first mapping entry. The computer-executable instructions further cause the apparatus to update the second mapping entry with the regenerated first transport slice identifier to obtain an updated second mapping entry. The computer-executable instructions further cause the apparatus to publish, to the PMS, the updated first mapping entry and the updated second mapping entry.

According to some embodiments of the disclosure, the computer-executable instructions further cause the apparatus to select the first network path assigned to the network slice based at least on a source address indicated by the first slice creation request, a destination address indicated by the first slice creation request, and network path constraints indicated by the first slice creation request. The computer-executable instructions further cause the apparatus to assign the first network path identifier to the first network path assigned to the network slice. The computer-executable instructions further cause the apparatus to publish, to the PMS, the first network path identifier of the first network path assigned to the network slice.

According to some embodiments of the disclosure, the computer-executable instructions further cause the apparatus to receive, from the controller, a second slice creation request. The second slice creation request includes the global identifier corresponding to the network slice. The computer-executable instructions further cause the apparatus to search the transport slice mapping database for the at least one mapping entry corresponding to the global identifier. The computer-executable instructions further cause the apparatus to generate, based on a determination that the at least one mapping entry was found, a second transport slice identifier corresponding to the network slice. The computer-executable instructions further cause the apparatus to add a third mapping entry to the transport slice mapping database indicating a third relationship between the global identifier and the second transport slice identifier. The computer-executable instructions further cause the apparatus to add a fourth mapping entry to the transport slice path mapping database indicating a fourth relationship between the second transport slice identifier and a second network path identifier of a second network path assigned to the network slice. The computer-executable instructions further cause the apparatus to publish, to the PMS, the third mapping entry and the fourth mapping entry.

According to some embodiments of the disclosure, the computer-executable instructions to generate the second transport slice identifier corresponding to the network slice include further computer-executable instructions to generate the second transport slice identifier based at least on a source address indicated by the second slice creation request and a destination address indicated by the second slice creation request.

According to some embodiments of the disclosure, the computer-executable instructions further cause the apparatus to regenerate the second transport slice identifier based on a determination that at least one of the source address and the destination address has changed, to obtain a regenerated second transport slice identifier. The computer-executable instructions further cause the apparatus to update the third mapping entry with the regenerated second transport slice identifier to obtain an updated third mapping entry. The computer-executable instructions further cause the apparatus to update the fourth mapping entry with the regenerated second transport slice identifier to obtain an updated fourth mapping entry. The computer-executable instructions further cause the apparatus to publish, to the PMS, the updated third mapping entry and the updated fourth mapping entry.

According to some embodiments of the disclosure, the computer-executable instructions to receive, from the controller, the first slice creation request include further computer-executable instructions to receive, from the controller via a first representational state transfer application programming interface (REST-API), the first slice creation request. The computer-executable instructions to publish, to the PMS, the first mapping entry and the second mapping entry include further computer-executable instructions to publish, to the PMS via a second REST-API, the first mapping entry and the second mapping entry.

According to another aspect of the disclosure, a method of identifying network slices in a transport network by a transport network device includes receiving, from a controller, a first slice creation request to create a network slice. The first slice creation request includes a global identifier corresponding to the network slice. The method further includes searching a transport slice mapping database for at least one mapping entry corresponding to the global identifier. The method further includes generating, based on determining that the at least one mapping entry was not found, a first transport slice identifier corresponding to the network slice. The method further includes adding a first mapping entry to the transport slice mapping database indicating a first relationship between the global identifier and the first transport slice identifier. The method further includes adding a second mapping entry to a transport slice path mapping database indicating a second relationship between the first transport slice identifier and a first network path identifier of a first network path assigned to the network slice. The method further includes publishing, to a PMS, the first mapping entry and the second mapping entry.

According to another aspect of the disclosure, a non-transitory computer-readable storage medium has recorded thereon a program for identifying network slices in a transport network by an apparatus. The program includes operations to receive, from a controller, a first slice creation request to create a network slice. The first slice creation request includes a global identifier corresponding to the network slice. The program includes further operations to search a transport slice mapping database for at least one mapping entry corresponding to the global identifier. The program includes further operations to generate, based on a determination that the at least one mapping entry was not found, a first transport slice identifier corresponding to the network slice. The program includes further operations to add a first mapping entry to the transport slice mapping database indicating a first relationship between the global identifier and the first transport slice identifier. The program includes further operations to add a second mapping entry to a transport slice path mapping database indicating a second relationship between the first transport slice identifier and a first network path identifier of a first network path assigned to the network slice. The program includes further operations to publish, to a PMS, the first mapping entry and the second mapping entry.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
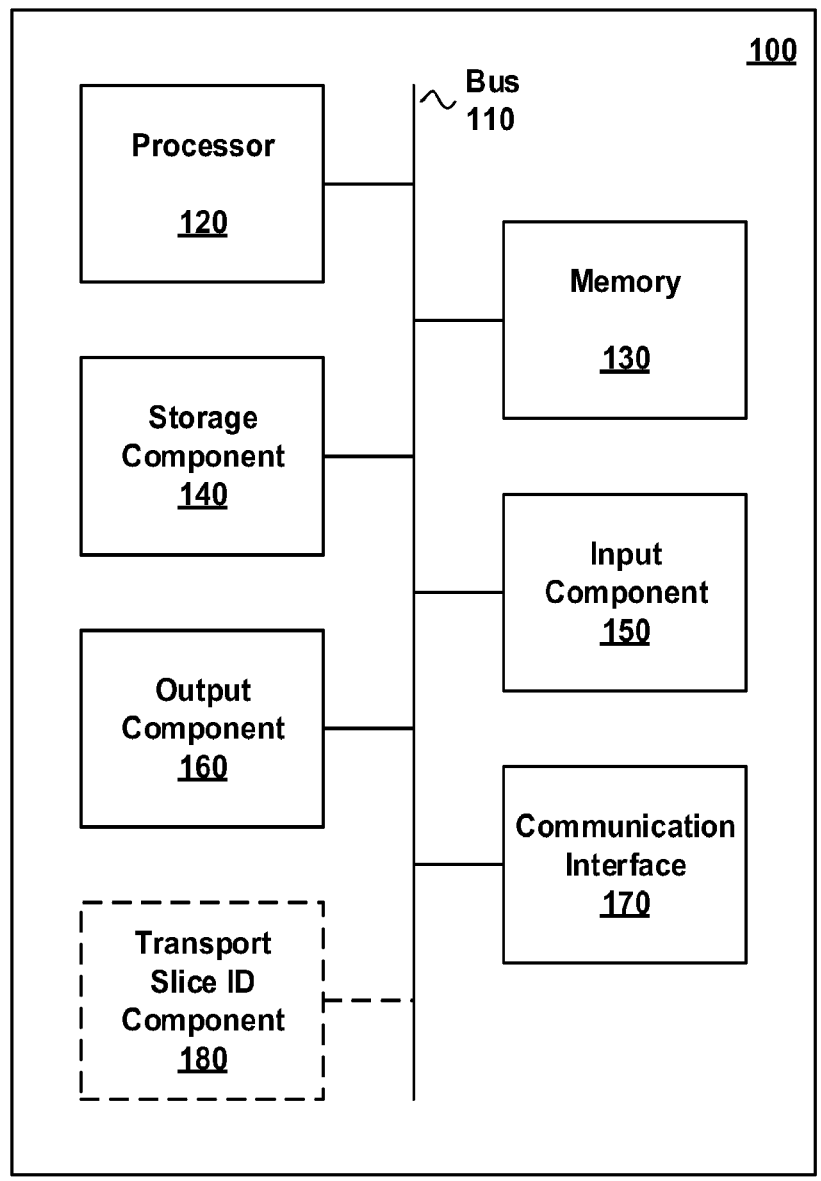
FIG. 1 is a diagram of an example device for identifying network slices in a transport network, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Network slicing may allow for network resources and network functions to be bundled into network slices depending on individual services, service level agreements (SLAs), and/or network path routing to be provided by each network slice. That is, a network slice over a communication network may provide customized network services by combining control plane (CP) and user plane (UP) network functions for network services necessary for a particular service over a core network (CN) and a radio access network (RAN) that may be interconnected to each other via a transport network (TN).

However, related mechanisms for deploying and implementing network slicing functionality across network domains may rely on the use of different network slice subnet management function (NSSMF) devices for each domain (e.g., RN-NSSMF, CN-NSSMF, and TN-NSSMF). As such, each domain (e.g., RAN, CN, and TN) may operate independently without awareness of the other domains. As a result, related network slicing mechanisms may be unable to correlate network usage information (e.g., paths, resources, performance) from each of the domains to present an end-to-end view of a network slice.

Aspects presented herein provide methods and apparatuses for identifying network slices in a TN such that end-to-end mapping of the network slice may be generated. The network slices may be identified within the TN without any interdependency from other domains (e.g., RAN, CN) and/or functionality changes to the other domains. Further, aspects presented herein may improve efficiency and performance of network slicing implementations by allowing for end-to-end monitoring of network slice management and transport network path visualizations.

FIG. 1 is diagram of an example device for identifying transport network slices in a transport network. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a transport slice identification (ID) component 180. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the transport slice identification component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

In some embodiments, the device 100 may comprise the transport slice identification component 180 configured to identify network slices in a transport network. For example, the transport slice identification component 180 may be configured to receive a slice creation request comprising a global identifier corresponding to a network slice, search a transport slice mapping database for at least one mapping entry corresponding to the global identifier, generate a transport slice identifier corresponding to the network slice, add a mapping entry to the transport slice mapping database, add another mapping entry to a transport slice path mapping database, and publish, to a performance monitoring system (PMS), the mapping entry and the another mapping entry.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
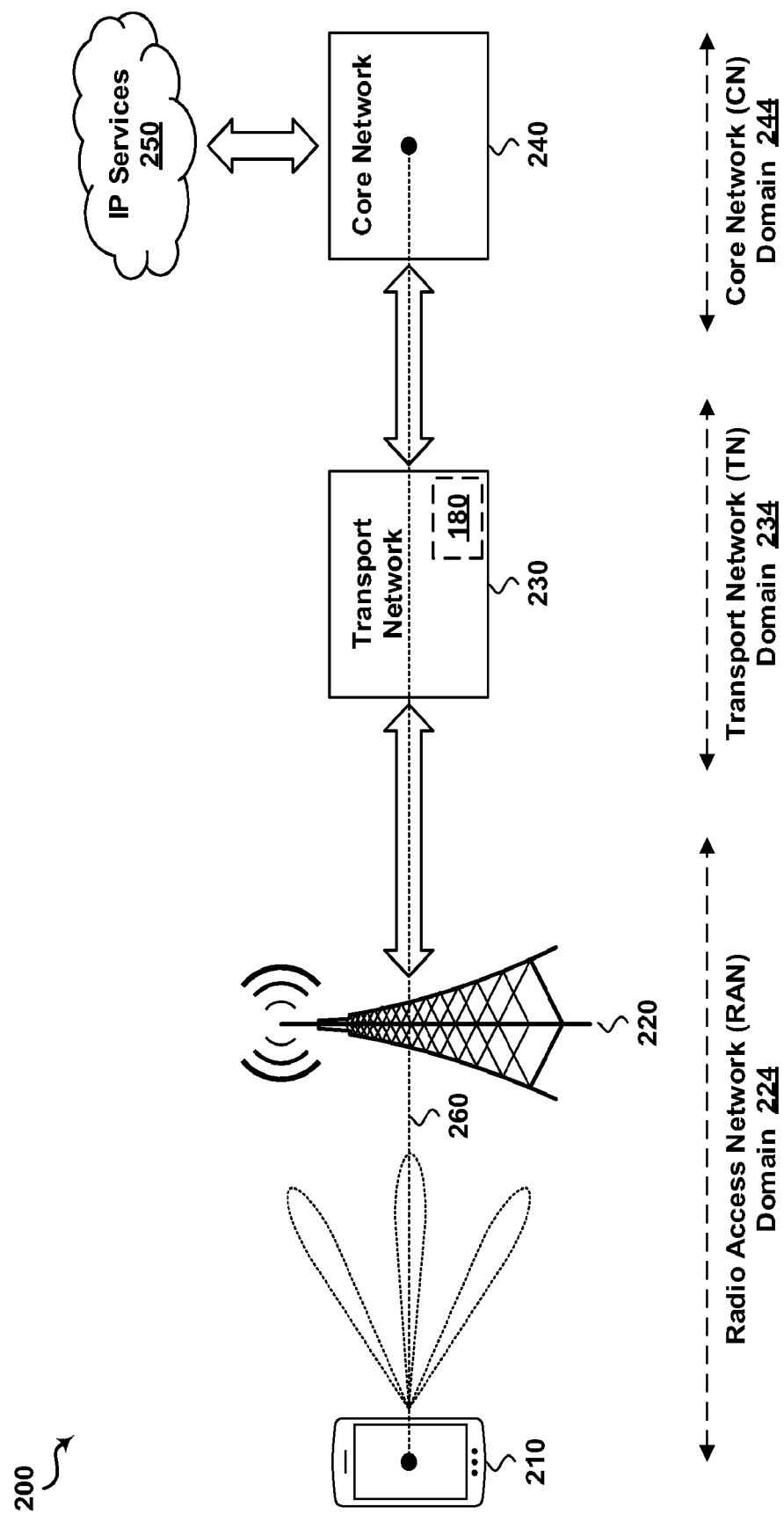
FIG. 2 is a schematic diagram of an example wireless communications system, in accordance with various embodiments of the present disclosure.

FIG. 2 is a diagram illustrating an example of a wireless communications system, according with various embodiments of the present disclosure. The wireless communications system 200 (which may also be referred to as a wireless wide area network (WWAN)) may include one or more user equipment (UE) 210, one or more base stations 220, at least one transport network 230, and at least one core network 240.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macrocells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or another type of base station.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless. Alternatively or additionally, the transport network 230 may comprise the transport slice identification component 180 of FIG. 1.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

Continuing to refer to FIG. 2, an end-to-end network slice 260 may provide a required connectivity between the UE 210 and the core network 240 with a specified performance commitment. The end-to-end network slice 260 may refer to a logical network topology connecting a number of endpoints (e.g., UE 210, core network 240) using a set of shared or dedicated network resources (e.g., base station 220, transport network 230) that are used to satisfy a specific performance commitment. The performance commitments that are to be satisfied by the end-to-end network slice 260 may be referred to as service level agreements (SLAs), service level objectives (SLOs), service level expectations (SLEs), and/or service level indicators (SLIs). Examples of these performance commitments may include, but are not limited to, a guaranteed minimum bandwidth (e.g., bandwidth between two end points in a particular direction), a guaranteed maximum latency (e.g., network latency when transmitting between two endpoints), a maximum permissible delay variation (PDV) (e.g., a maximum difference in a one-way delay between sequentially transmitted packets in a flow), a maximum permissible packet loss rate (e.g., a ratio of packets dropped to packets transmitted), and a minimum availability ratio (e.g., a ratio of uptime to the sum of uptime and downtime).

The UE 210 may access multiple network slices 260 over one or more base stations 220 (not shown). In some embodiments, each network slice 260 may serve a particular service type with a specified performance commitment.

In some embodiments, each network slice 260 may be identified by a global identifier, such as a single network slice selection assistance information (S-NSSAI). That is, the S-NSSAI may be used by the RAN domain 224, the TN domain 234, and the CN domain 244 to identify the network slice 260.

The S-NSSAI may comprise information regarding a slice and/or service type (SST), which may indicate an expected behavior of the particular network slice in terms of features and/or services. The S-NSSAI may further comprise a slice differentiator (SD), which may allow for further differentiation for selecting a network slice instance from one or more network slice instances that may comply with the indicated SST. Alternatively or additionally, the SST and/or the SD comprised by the S-NSSAI may use standard values and/or may use values specific to a particular network provider (e.g., public land mobile network (PLMN)).

Figure 3:
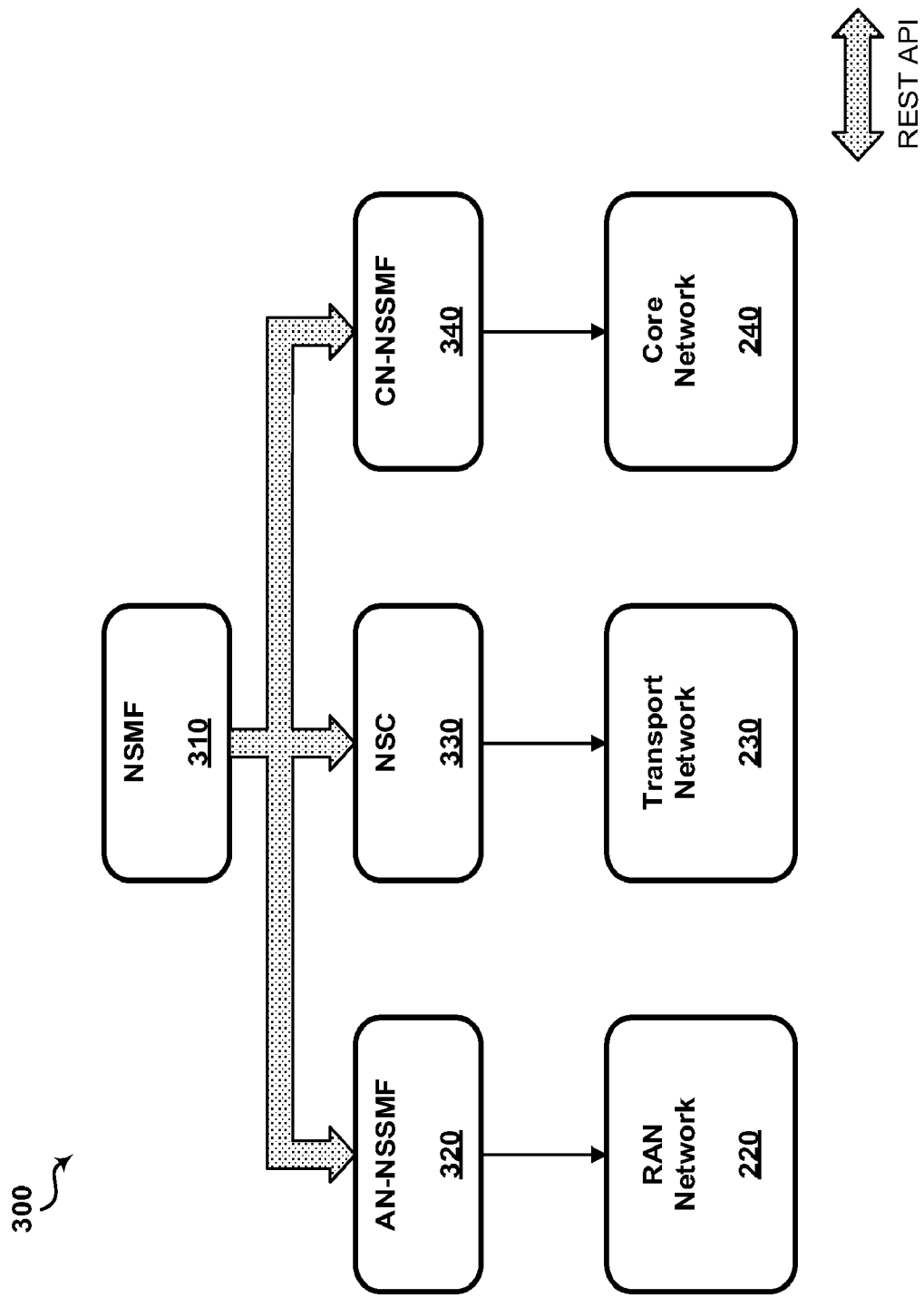
FIG. 3 is an example of a high-level network slice architecture for network slice management and configuration in a communications system, in accordance with various embodiments of the present disclosure.

FIG. 3 is an example of a high-level network slice architecture for network slice management and configuration in a communications system, in accordance with various embodiments of the present disclosure. The high-level network slice architecture 300 described in FIG. 3 may be implemented by and/or be included with the wireless communications system 200 described above with reference to FIG. 2, and may include additional features not mentioned above. In some embodiments, at least a portion of the high-level network slice architecture 300 illustrated in FIG. 3 may be performed by the device 100 of FIG. 1, including the transport slice identification component 180.

As shown in FIG. 3, a network slice management function (NSMF) 310 may request each domain (e.g., RAN, TN, CN) of the network architecture to create a portion (e.g., subnet) of the network slice 260 in each network domain. That is, the network slice 260 may be implemented by a combination of subnets created within each domain of the network to establish the communication path across the communications system. The NSMF 310 may be configured to generate a S-NSSAI that uniquely identifies the network slice 260. Alternatively or additionally, the NSMF 310 may create one or more service profiles requesting dedicated resources for the network slice 260 in each network domain. The service profiles may be determined according to one or more services to be provided over the network slice 260 and/or the specified performance commitments of the network slice 260.

In some embodiments, the NSMF 310 may use a representational state transfer application programming interface (REST-API) to request each of the domains to create their respective portions of the network slice 260. Alternatively or additionally, the NSMF 310 may transmit and/or send a message comprising the slice creation request to a network element corresponding to each of the network domains. The present disclosure is not limited in this regard.

In some embodiments, the NSMF 310 may send a slice creation request to an access network-network slice subnet management function (AN-NSSMF) 320, such as a RAN path computation element and/or a RAN orchestrator, to create the RAN domain portion of the network slice 260. For example, the slice creation request sent by the NSMF 310 to the AN-NSSMF 320 may comprise the S-NSSAI identifying the network slice 260 and/or the service profile determined for the RAN domain 224.

In response to receiving the slice creation request from the NSMF 310, the AN-NSSMF 320 may allocate one or more resources (e.g., time periods, frequency ranges, bandwidths) of the RAN domain 224 for the network slice 260. That is, the AN-NSSMF 320 may configure one or more base stations 220 of the RAN domain 224 and/or other network elements of the RAN domain 224 to provide a network path between the UE 210 and the transport network 230 according to the performance commitments specified for the network slice 260. Alternatively or additionally, the AN-NSSMF 320 may further allocate the RAN resources according to other performance factors such as, but not limited to, available processing throughput of allocated devices, latency considerations, geographical location of allocated devices, priority of services associated with the network slice 260, and the like.

In some embodiments, the NSMF 310 may send a slice creation request to a transport network-network slice subnet management function (TN-NSSMF) 330, such as a network slice controller (NSC) and/or a TN orchestrator, to create the TN domain portion of the network slice 260. For example, the slice creation request sent by the NSMF 310 to the NSC 330 may comprise the S-NSSAI identifying the network slice 260 and/or the service profile determined for the TN domain 234.

In other embodiments, the NSC 330 may comprise the transport slice identification component 180. In such embodiments, the NSC 330 may be further configured to generate a transport slice identifier corresponding to the network slice 260 based at least on the S-NSSAI indicated by the slice creation request received from the NSMF 310, as described in further detail in reference to FIGS. 4 and 5.

In response to receiving the slice creation request from the NSMF 310, the NSC 330 may compute and/or allocate one or more transport network paths for the network slice 260. For example, the NSC 330 may select transport network paths based at least on a source address indicated by the slice creation request, a destination address indicated by the slice creation request, and/or network path constraints (e.g., service profile, performance commitments) indicated by the slice creation request. Alternatively or additionally, the NSC 330 may configure one or more network elements of the TN network 230 to provide the one or more transport network paths between the RAN domain 224 and the core network 240 according to the performance commitments specified for the network slice 260.

In some embodiments, the NSMF 310 may send a slice creation request to a core network-network slice subnet management function (CN-NSSMF) 340, such as a CN path computation element and/or a CN orchestrator, to create the CN domain portion of the network slice 260. For example, the slice creation request sent by the NSMF 310 to the CN-NSSMF 340 may comprise the S-NSSAI identifying the network slice 260 and/or the service profile determined for the CN domain 244.

In response to receiving the slice creation request from the NSMF 310, the CN-NSSMF 340 may compute and/or allocate one or more core network paths for the network slice 260 to provide a network path between the UE 210 and one or more services indicated by the slice creation request. For example, the CN-NSSMF 340 may select core network paths based at least on a source address indicated by the slice creation request, a destination address indicated by the slice creation request, and/or network path constraints (e.g., service profile, performance commitments) indicated by the slice creation request. Alternatively or additionally, the CN-NSSMF 340 may configure one or more network elements of the CN network 240 to provide the one or more services indicated by the slice creation request to the UE 210, according to the performance commitments specified for the network slice 260.

As described above in reference to FIG. 3, each domain (e.g., RAN, TN, CN) of the network architecture may comprise an independent network slicing management function (e.g., AN-NSSMF 320, NSC 330, CN-NSSMF 340). These management functions may manage their respective portions of the network slice 260 without coordination and/or cooperation among them. As a result, a performance monitoring process may be unable to correlate network usage information (e.g., paths, resources, performance) from each of the domains. Thus, end-to-end network slice performance monitoring and transport path visualizations may not be effected.

Advantageously, the aspects described herein may provide for a transport slice identification component 180 that may be configured to generate a transport slice identifier corresponding to the network slice 260 based at least on the S-NSSAI. The transport slice identification component 180 may be further configured to publish a mapping of the transport slice identifier to the network slice 260 and to the transport network path allocated to the network slice 260. As a result, a performance monitoring system may perform end-to-end monitoring of network slice performance, as well as, visualizations of the transport network paths. Thus, allowing for fault detection and isolation at an individual network slice and/or transport flow level.

Figure 4:
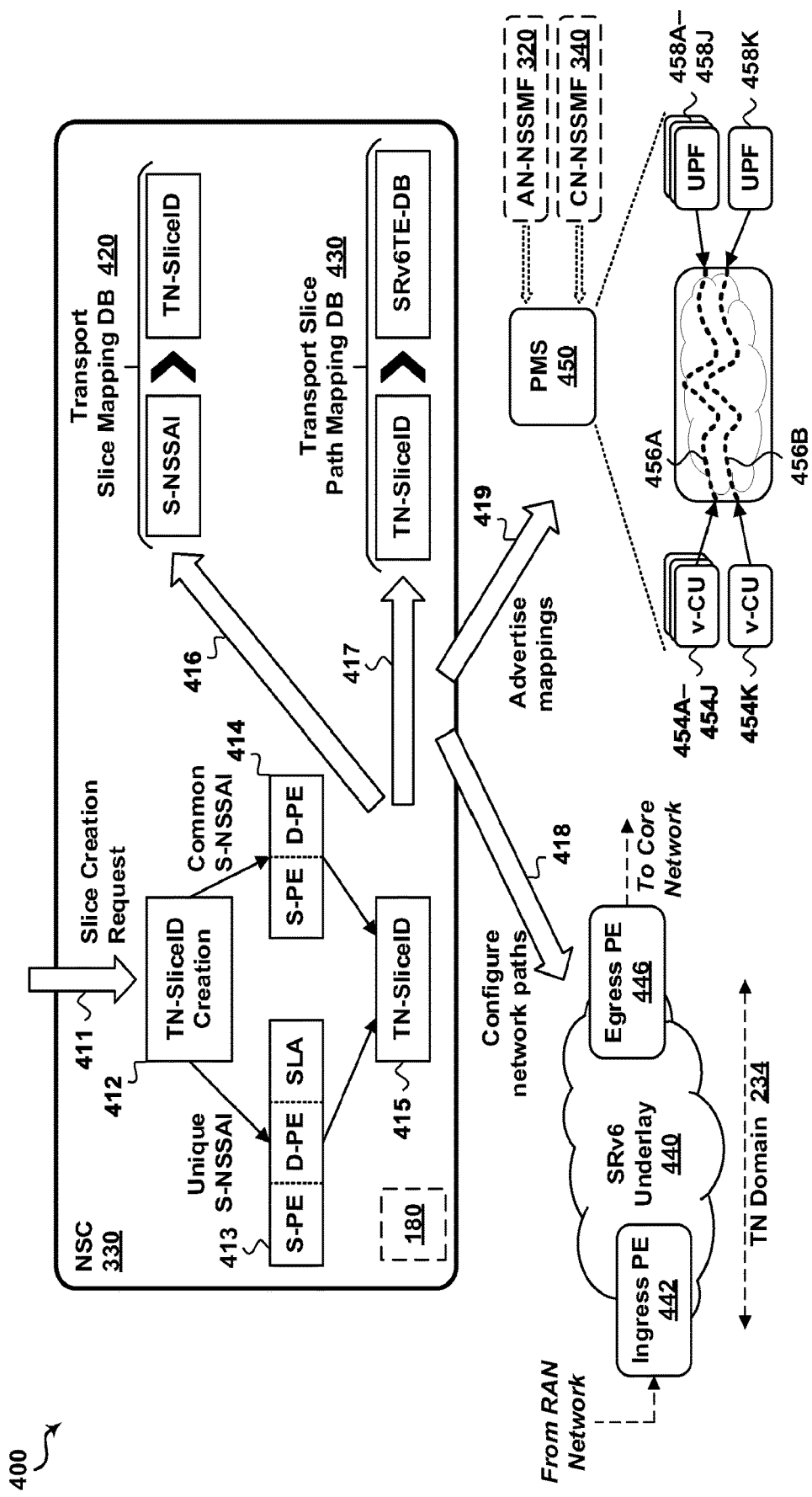
FIG. 4 illustrates an example process for identifying network slices in a transport network, in accordance with various embodiments of the present disclosure.

FIG. 4 illustrates an example process for identifying network slices in a transport network, in accordance with various embodiments of the present disclosure. The process 400 depicted in FIG. 4 may be implemented and/or executed by the NSC 330 described in FIG. 3, including the transport slice identification component 180, which may be hosted by the device 100 described in FIG. 1, and may be an element of the wireless communications system 200 described in FIG. 2. The NSC 330 described in FIG. 4 may include and/or may be similar in many respects to the NSC 330 described above with reference to FIG. 3, and may include additional features not mentioned above.

At operation 411, the NSC 330 may receive a slice creation request. In some embodiments, the slice creation request may be obtained from a NSMF 310 via a REST-API. Alternatively or additionally, the NSMF 310 may transmit to the NSC 330 a message comprising the slice creation request. The slice creation request may comprise a global identifier (e.g., S-NSSAI) corresponding to the network slice 260 that is to be created. The slice creation request may further indicate a source address, a destination address, and network path constraints such as performance commitments (e.g., SLA, SLO, SLE, SLI) specified for the network slice 260. The source address may correspond to an ingress transport boundary router (e.g., ingress provider edge (PE) 442) connected to the RAN domain 224. The destination address may correspond to an egress transport boundary router (e.g., egress PE 446) connected to the CN domain 244.

At operation 412, the NSC 330 may start generating a unique transport slice identifier (e.g., TN-SliceID 415) that corresponds to the network slice 260, in response to receiving the slice creation request at operation 411. For example, the NSC 330 may determine whether the global identifier S-NSSAI indicated by the slice creation request is a unique S-NSSAI (e.g., no transport resources are currently allocated to the S-NSSAI) or whether the S-NSSAI is a common S-NSSAI (e.g., transport resources are currently allocated to the S-NSSAI). For example, a common S-NSSAI may be utilized in a scenario in which multiple transport network paths may be required for a dedicated service (e.g., user plane function) under a same network slice.

In some embodiments, the NSC 330 may search a transport slice mapping database 420 for at least one mapping entry corresponding to the global identifier S-NSSAI. If or when the search results indicate that the global identifier S-NSSAI was not found in the transport slice mapping database 420, the NSC 330 may determine that the global identifier S-NSSAI indicated by the slice creation request is a unique S-NSSAI. Alternatively or additionally, if or when the search results indicate that the global identifier S-NSSAI was found in the transport slice mapping database 420, the NSC 330 may determine that the global identifier S-NSSAI indicated by the slice creation request is a common S-NSSAI.

At operation 413, the NSC 330, based on determining that the global identifier S-NSSAI indicated by the slice creation request is a unique S-NSSAI, may generate the TN-SliceID 415 based at least on the source address indicated by the slice creation request, the destination address indicated by the slice creation request, and the network path constraints indicated by the slice creation request.

In some embodiments, the NSC 330 may be configured to monitor the tuple value (e.g., source address, destination address, network path constraints) for any changes. The NSC may be further configured to regenerate the TN-SliceID 415 based on a determination that at least one of the source address, the destination address, and the network path constraints has changed.

At operation 414, the NSC 330, based on determining that the global identifier S-NSSAI indicated by the slice creation request is a common S-NSSAI, may generate the TN-SliceID 415 based at least on the source address indicated by the slice creation request and the destination address indicated by the slice creation request.

In some embodiments, the NSC 330 may be configured to monitor the value pair (e.g., source address, destination address) for any changes. The NSC may be further configured to regenerate the TN-SliceID 415 based on a determination that at least one of the source address and the destination address has changed.

At operation 416, the NSC 330 may add a mapping entry to the transport slice mapping database 420 indicating a relationship (e.g., correspondence) between the global identifier S-NSSAI indicated by the slice creation request and the TN-SliceID 415. Alternatively or additionally, the NSC 330 may update the mapping entry in the transport slice mapping database 420 with a regenerated TN-SliceID 415 if or when a change to the tuple value used to generate the TN-SliceID 415 has been determined. That is, the NSC 330 may be configured to maintain the transport slice mapping database 420 comprising the mappings between the global identifier S-NSSAI and their respective TN-SliceIDs 415. For example, the NSC 330 may remove a mapping entry from the transport slice mapping database 420 based on a determination that the respective TN-SliceIDs 415 are no longer needed or in use and/or based on a determination that the global identifier S-NSSAI is no longer needed or in use.

The transport slice mapping database 420 may comprise a single database or may comprise different logical, virtual, or physical databases, depending on a design of the NSC 330 and/or the wireless communications system 200. Alternatively or additionally, the transport slice mapping database 420 may be implemented by one or more data processing devices, such as any type of known computer, server, or data processing device. For example, the transport slice mapping database 420 may comprise a processor, a PC, a PCB comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device. Those of skill in the art will appreciate that the functionality of the transport slice mapping database 420 as described herein may be spread across multiple data processing devices, for example, to distribute processing load across multiple computers, to segregate transactions based on geographic location, user access level, quality of service (QOS), etc. The present disclosure is not limited in this regard.

At operation 417, the NSC 330 may add a mapping entry to a transport slice path mapping database 430 indicating a relationship (e.g., correspondence) between the TN-SliceID 415 and a network path identifier of a transport network path assigned to the network slice 260. For example, the network path identifier may correspond to an entry in a segment routing IPv6 (SRv6) transport element database (SRv6TE-DB) that defines the configuration of the transport network path assigned to the network slice 260. Alternatively or additionally, the NSC 330 may update the mapping entry in the transport slice path mapping database 430 with a regenerated TN-SliceID 415 if or when a change to the tuple value used to generate the TN-SliceID 415 has been determined. That is, the NSC 330 may be configured to maintain the transport slice path mapping database 430 comprising the mappings between the TN-SliceID 415 and their respective network path identifiers. For example, the NSC 330 may remove a mapping entry from the transport slice path mapping database 430 based on a determination that the respective network path identifier is no longer needed or in use and/or based on a determination that the corresponding network slice 260 is no longer needed or in use.

The transport slice path mapping database 430 may comprise a single database or may comprise different logical, virtual, or physical databases, depending on a design of the NSC 330 and/or the wireless communications system 200. Alternatively or additionally, the transport slice path mapping database 430 may be implemented by one or more data processing devices, such as any type of known computer, server, or data processing device. For example, the transport slice path mapping database 430 may comprise a processor, a PC, a PCB comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device. Those of skill in the art will appreciate that the functionality of the transport slice path mapping database 430 as described herein may be spread across multiple data processing devices, for example, to distribute processing load across multiple computers, to segregate transactions based on geographic location, user access level, quality of service (QOS), etc. The present disclosure is not limited in this regard.

At operation 418, the NSC 330 may configure one or more transport network paths for the network slice 260 according to the source address, the destination address, and the network path constraints indicated by the slice creation request. For example, the NSC 330 may select the transport network path to be assigned to the network slice 260 based at least on the source address, the destination address, and the network path constraints indicated by the slice creation request. Alternatively or additionally, the NSC 330 may assign a network path identifier of the transport network path to the network slice 260, as described above in reference to operation 417.

In some embodiments, the NSC 330 may identify an ingress PE 442 based on the source address indicated by the slice creation request and/or may identify an egress PE 446 based on the destination address indicated by the slice creation request. Alternatively or additionally, the NSC 330 may compute a transport network path between the identified ingress PE 442 and the identified egress PE 446, according to the network path constraints indicated by the slice creation request (e.g., low latency, high bandwidth, high reliability). That is, the NSC 330 may configure one or more transport network elements (e.g., nodes (not shown)) of the TN domain 234 to provide connectivity between the ingress PE 442 and the egress PE 446. For example, the TN domain 234 may comprise a SRv6 underlay 440 to provide configurable connectivity and implement the one or more transport network paths.

It may be understood that other technologies and/or network configurations may be utilized to implement the one or more transport network paths without deviating from the scope of the present disclosure. For example, the NSC 330 may utilize at least one of a path computation element protocol (PCEP) and a network configuration protocol (NETCONF) to deliver, modify, and/or delete network configurations.

At operation 419, the NSC 330 may publish, to a performance monitoring system (PMS) 450, the mapping indicating the correspondence between the global identifier S-NSSAI indicated by the slice creation request and the TN-SliceID 415 and the mapping indicating the correspondence between the TN-SliceID 415 and the network path identifier of a transport network path assigned to the network slice 260. Alternatively or additionally, the NSC 330 may advertise the transport slice mapping database 420 and the transport slice path mapping database 430 to provide the mappings between the S-NSSAI, the TN-SliceID 415, and the SRv6TE-DB to the PMS 450. In some embodiments, the mapping information may be published and/or provided to the PMS 450 via a REST-API.

The PMS 450 may receive further mapping information from the AN-NSSMF 320 and the CN-NSSMF 340. That is, the remaining domains of the network slice architecture 300 may export their respective mappings between the global identifier S-NSSAI and their corresponding network slice identification information.

The PMS 450 may be configured to correlate network usage information (e.g., paths, resources, performance) from each of the network slice architecture domains (e.g., RAN, TN, CN) to present an end-to-end view of the network slice 260. Alternatively or additionally, the PMS 450 may be further use the mapping information provided by each of the network slice architecture domains to provide an end-to-end network slice path visualization. In some embodiments, the PMS 450 may utilize a border gateway protocol-link state (BGP-LS) protocol to obtain information (e.g., configuration, status, performance) of the transport domain 234 for creating the path visualizations.

For example, as shown in FIG. 4, based on an example of mapping information, the PMS 450 may present that virtual central units (v-CU) 454A-454J in the RAN domain 224 are communicatively connected (e.g., coupled) to user plane functions (UPF) 458A-458J via a shared a transport path 456A. The PMS 450 may also present that v-CU 454K is communicatively connected with UPF 458K via transport path 456B.

It may be understood that the example network slice configuration presented by the PMS 450 as illustrated in FIG. 4 is only one example of a near infinite number of possible network slice configurations and that the PMS 450 may present any other possible network slice configuration without deviating from the scope of the present disclosure.

The number and arrangement of components shown in FIG. 4 are provided as an example. In practice, there may be additional components, fewer components, different components, or differently arranged components than those shown in FIG. 4. Furthermore, two or more components shown in FIG. 4 may be implemented within a single component, or a single component shown in FIG. 4 may be implemented as multiple, distributed components. Additionally or alternatively, a set of (one or more) components shown in FIG. 4 may perform one or more functions described as being performed by another set of components shown in FIGS. 1-4.

It may be understood that the specific order of the operations, the quantity of operations, and arrangement of operations in the process 400 described in FIG. 4 is an illustration of one example approach. Based upon design preferences, it may be understood that the specific order, quantity, and/or arrangement of operations in the process 400 may be rearranged. Further, some operations may be added, combined, or omitted.

Figure 5:
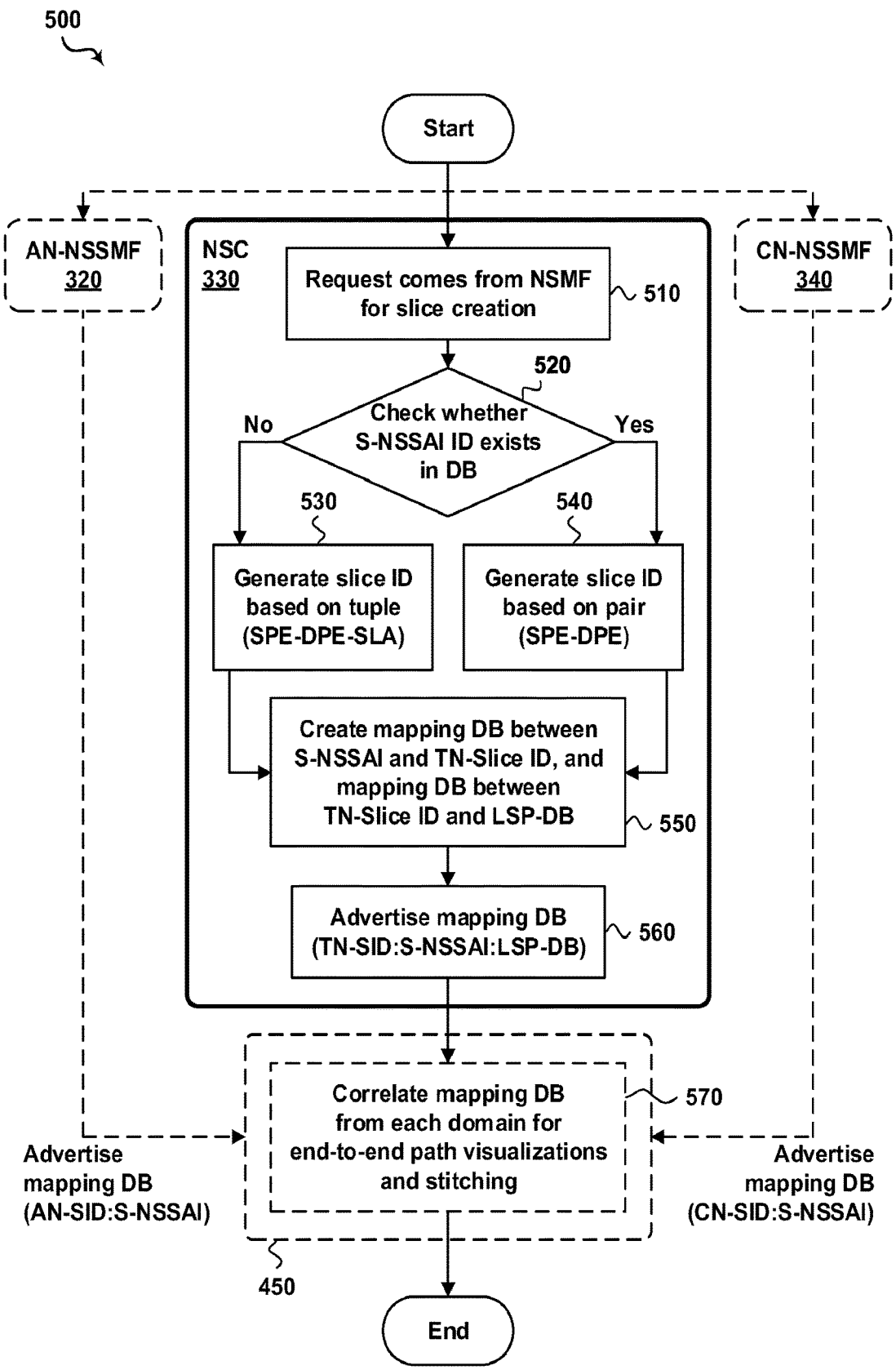
FIG. 5 is a flowchart of an example process for identifying network slices in a transport network, in accordance with various embodiments of the present disclosure.

FIG. 5 is flowchart of an example process for identifying network slices in a transport network, in accordance with various embodiments of the present disclosure. The process 500 depicted in FIG. 5 may be performed by the NSC 330 of FIG. 3, that may be hosted by the device 100 of FIG. 1, may include the transport slice identification component 180, and may be an element of the wireless communications system 200 described in FIG. 2. The process 500 may be performed by the NSC 330 in conjunction with the AN-NSSMF 320 of FIG. 3, the CN-NSSMF of FIG. 3, and the PMS 450 of FIG. 4. The NSC 330 described in FIG. 5 may include and/or may be similar in many respects to the NSC 330 described above with reference to FIGS. 3 and 4, and may include additional features not mentioned above.

At operation 510, the NSC 330 may receive a slice creation request requesting to create a portion of a network slice 260 in the TN domain 234. In some embodiments, the slice creation request may be obtained from a NSMF 310 via a REST-API. Alternatively or additionally, the NSMF 310 may transmit to the NSC 330 a message comprising the slice creation request. The slice creation request may comprise a global identifier (e.g., S-NSSAI) corresponding to the network slice 260 that is to be created. The slice creation request may further indicate a source address, a destination address, and network path constraints such as performance commitments (e.g., SLA, SLO, SLE, SLI) specified for the network slice 260.

At operation 520, the NSC 330 may check whether the S-NSSAI indicated by the slice creation request exists in a transport slice mapping DB 420. That is, the NSC 330 may determine whether the S-NSSAI indicated by the slice creation request is a unique S-NSSAI or a common S-NSSAI as described above in reference to operations 412-414 of FIG. 4. If the S-NSSAI does not exist in the transport slice mapping DB 420 (520:No), the NSC 330 may proceed to operation 530, otherwise, the NSC 330 may proceed to operation 540 (520:Yes).

At operation 530, the NSC 330 may generate TN-SliceID 415 based at least on the tuple value formed from the source address indicated by the slice creation request, the destination address indicated by the slice creation request, and the network path constraints indicated by the slice creation request, as described above in reference to operation 413 of FIG. 4.

At operation 540, the NSC 330 may generate TN-SliceID 415 based at least on the value pair formed from the source address indicated by the slice creation request and the destination address indicated by the slice creation request, as described above in reference to operation 414 of FIG. 4.

At operation 550, the NSC 330 may create a mapping between the S-NSSAI and the TN-SliceID 415 and store the mapping in a database, such as the transport slice mapping database 420. Alternatively or additionally, the NSC 330 may update the mapping entry in the transport slice mapping database 420 with a regenerated TN-SliceID 415 if or when a change to the tuple value used to generate the TN-SliceID 415 has been determined, as described above in reference to operation 416 of FIG. 4.

Continuing to refer to operation 550, the NSC 330 may create a mapping between the TN-SliceID 415 and a network path identifier of a transport network path assigned to the network slice 260 and store the mapping in a database, such as the transport slice path mapping database 430. For example, the network path identifier may correspond to an entry in a label switched paths (LSP) DB. In another example, the network path identifier may correspond to an entry in a SRv6 transport element database, as described above in reference to operation 417 of FIG. 4.

At operation 560, the NSC 330 may advertise, to the PMS 450, the mapping indicating the correspondence between the global identifier S-NSSAI indicated by the slice creation request and the TN-SliceID 415 and the mapping indicating the correspondence between the TN-SliceID 415 and the network path identifier of a transport network path assigned to the network slice 260. Alternatively or additionally, the NSC 330 may publish, to a performance monitoring system (PMS) 450, the mappings as described above in reference to operation 419 of FIG. 4. In some embodiments, the mapping information may be published and/or provided to the PMS 450 via a REST-API.

At operation 570, the PMS 450 may receive the mapping information from the NSC 330, and, in addition, the PMS 450 may receive further mapping information from the AN-NSSMF 320 and the CN-NSSMF 340. That is, the remaining domains of the network slice architecture 300 may advertise their respective mappings between the global identifier S-NSSAI and their corresponding network slice identification information.

The PMS 450 may be configured to correlate the mapping information from each of the network slice architecture domains (e.g., RAN, TN, CN) to present an end-to-end view of the network slice 260. Alternatively or additionally, the PMS 450 may be further use the mapping information provided by each of the network slice architecture domains to provide an end-to-end network slice path visualization, as described above in reference to operation 419 of FIG. 4.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally or alternatively, a set of (one or more) components shown in FIG. 5 may perform one or more functions described as being performed by another set of components shown in FIGS. 1-5.

It may be understood that the specific order of the operations, the quantity of operations, and arrangement of operations in the process 500 described in FIG. 5 is an illustration of one example approach. Based upon design preferences, it may be understood that the specific order, quantity, and/or arrangement of operations in the process 500 may be rearranged. Further, some operations may be added, combined, or omitted.

Advantageously, and as described in reference to FIGS. 1-5, the aspects described herein may provide for a transport slice identification component 180 that may be configured to generate a transport slice identifier corresponding to the network slice 260 based at least on the S-NSSAI. The transport slice identification component 180 may be further configured to publish a mapping of the transport slice identifier to the network slice 260 and to the transport network path allocated to the network slice 260. As a result, a performance monitoring system may perform end-to-end monitoring of network slice performance, as well as, visualizations of the transport network paths. Thus, allowing for fault detection and isolation at an individual network slice and/or transport flow level.

Figure 6:
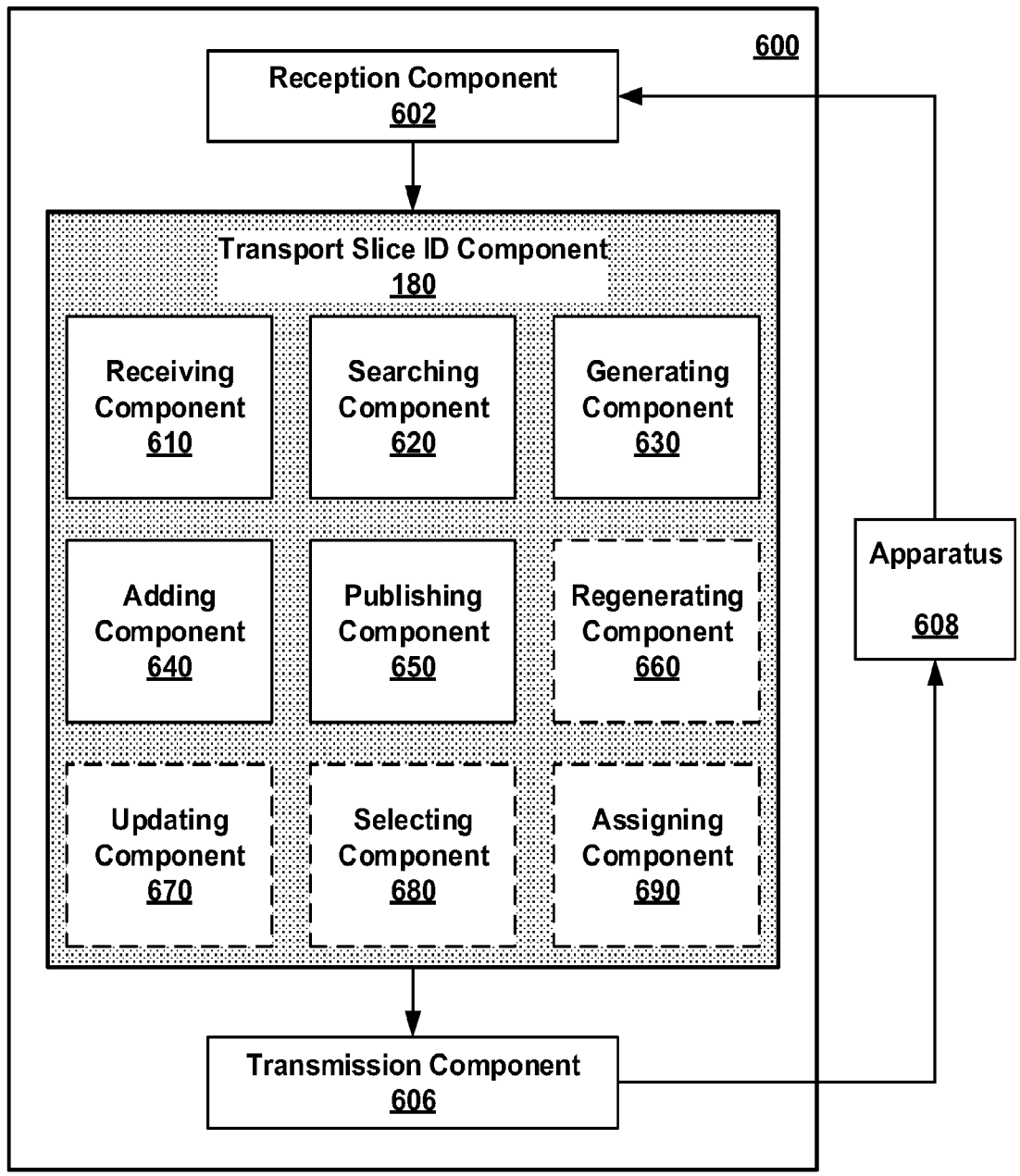
FIG. 6 is a block diagram of an example apparatus for identifying network slices in a transport network, in accordance with various embodiments of the present disclosure.

FIG. 6 is a block diagram of an example apparatus 600 for identifying network slices in a transport network. The apparatus 600 may be a computing device (e.g., device 100 of FIG. 1, NSC 330 of FIGS. 3-5) or a computing device may include the apparatus 600. In some embodiments, the apparatus 600 may include a reception component 602 configured to receive communications (e.g., wired, wireless) from another apparatus (e.g., apparatus 608), a transport slice identification component 180 configured to identify network slices in a transport network, and a transmission component 606 configured to transmit communications (e.g., wired, wireless) to another apparatus (e.g., apparatus 608). The components of the apparatus 600 may be in communication with one another (e.g., via one or more buses or electrical connections). As shown in FIG. 6, the apparatus 600 may be in communication with another apparatus 608 (such as the PMS 450 of FIG. 4, a database, a server, or another computing device) using the reception component 602 and/or the transmission component 606.

In some embodiments, the apparatus 600 may be configured to perform one or more operations described herein in connection with FIGS. 1-5. Alternatively or additionally, the apparatus 600 may be configured to perform one or more processes described herein, such as method 700 of FIG. 7. In some embodiments, the apparatus 600 may include one or more components of the device 100 described above in connection with FIGS. 1-5.

The reception component 602 may receive communications, such as control information, data communications, or a combination thereof, from the apparatus 608 (e.g., the PMS 450 of FIG. 4). The reception component 602 may provide received communications to one or more other components of the apparatus 600, such as the transport slice identification component 180. In some aspects, the reception component 602 may perform signal processing on the received communications, and may provide the processed signals to the one or more other components. In some embodiments, the reception component 602 may include one or more antennas, a receive processor, a controller/processor, a memory, or a combination thereof, of the device 100 described above in reference to FIG. 1.

The transmission component 606 may transmit communications, such as control information, data communications, or a combination thereof, to the apparatus 608 (e.g., the PMS 450 of FIG. 4). In some embodiments, the transport slice identification component 180 may generate communications and may transmit the generated communications to the transmission component 606 for transmission to the apparatus 608. In some embodiments, the transmission component 606 may perform signal processing on the generated communications, and may transmit the processed signals to the apparatus 608. In other embodiments, the transmission component 606 may include one or more antennas, a transmit processor, a controller/processor, a memory, or a combination thereof, of the device 100 described above in reference to FIG. 1. In some embodiments, the transmission component 606 may be co-located with the reception component 602 such as in a transceiver and/or a transceiver component.

The transport slice identification component 180 may be configured to identify network slices in a transport network by a transport network device. In some embodiments, the transport slice identification component 180 may include a set of components, such as a receiving component 610 configured to receive a slice creation request to create a network slice, a searching component 620 configured to search a transport slice mapping database for the global identifier, a generating component 630 configured to generate a transport slice identifier corresponding to the network slice, an adding component 640 configured to add mapping entries to the transport slice mapping database and to the transport slice path mapping database, and a publishing component 650 configured to publish the mapping entries.

Alternatively or additionally, the transport slice identification component 180 may further include a regenerating component 660 configured to regenerate the transport slice identifiers, an updating component 670 configured to update mapping entries to the transport slice mapping database and to the transport slice path mapping database, a selecting component 680 configured to select a network path assigned to the network slice, and an assigning component 690 configured to assign a network path identifier to the network path assigned to the network slice.

In some embodiments, the set of components may be separate and distinct from the transport slice identification component 180. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 1.

Figure 7:
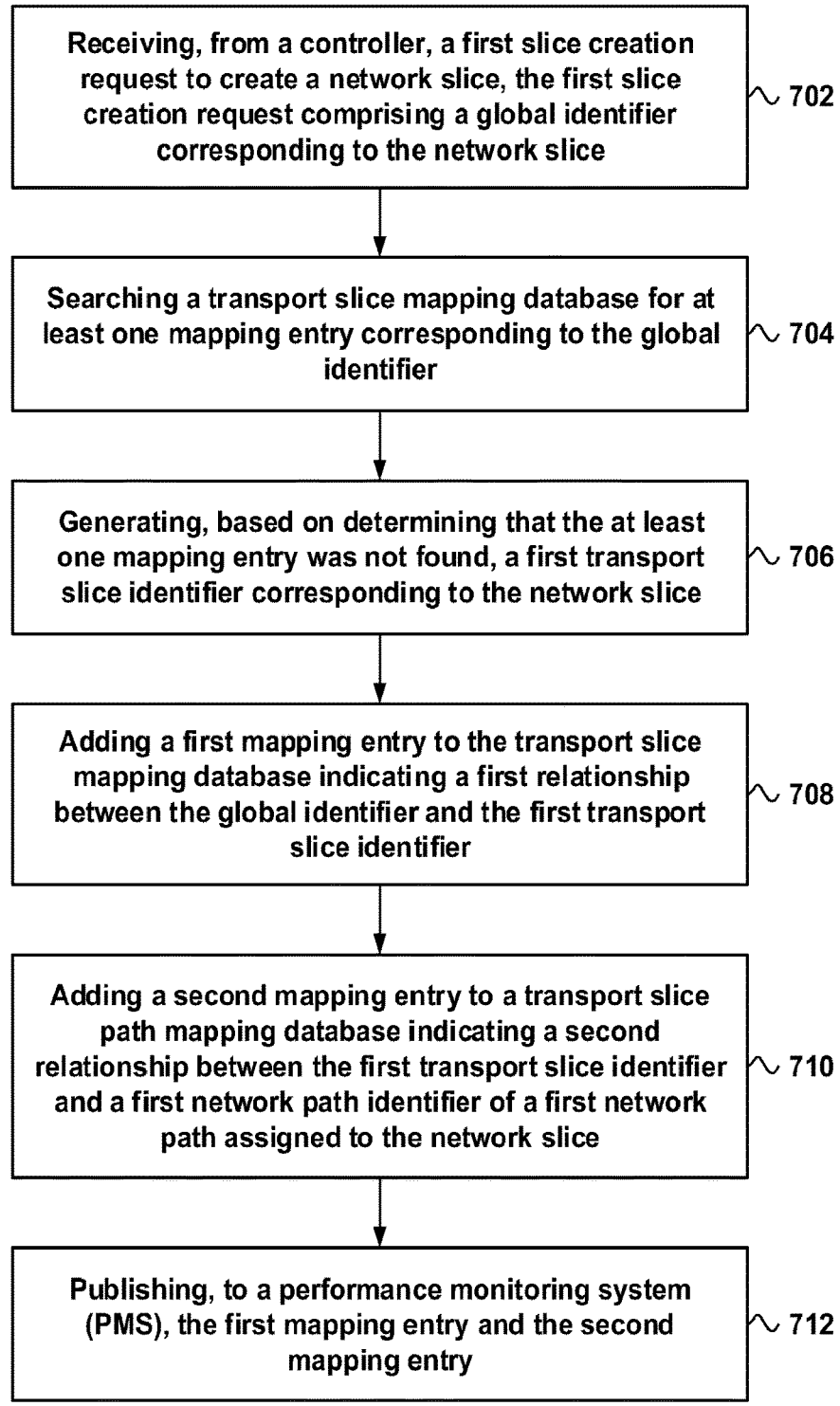
FIG. 7 is flowchart of an example method of identifying network slices in a transport network, in accordance with various embodiments of the present disclosure.

Referring to FIG. 7, in operation, a device 100 may perform a method 700 of identifying network slices in a transport network. The method 700 may be performed by the device 100 (which may include the memory 130 and which may be the entire device 100 and/or one or more components of the device 100, such as the processor 120, the input component 150, the output component 160, the communication interface 170, and/or the transport slice identification component 180). The method 700 may be performed by the transport slice identification component 180 in communication with the apparatus 608 (e.g., PMS 450 of FIG. 4).

At block 702 of FIG. 7, the method 700 may include receiving, from a controller, a first slice creation request to create a network slice, the first slice creation request comprising a global identifier corresponding to the network slice. For example, in an embodiment, the device 100, the transport slice identification component 180, and/or the receiving component 610 may be configured to or may comprise means for receiving, from a controller 330, a first slice creation request to create a network slice 260, the first slice creation request comprising a global identifier corresponding to the network slice 260.

For example, the receiving at block 702 may include receiving, from the controller via a first REST-API, the first slice creation request, as described above in reference to FIGS. 3-4. Alternatively or additionally, the NSMF 310 may transmit to the NSC 330 a message comprising the slice creation request.

In some embodiments, the first slice creation request may comprise a global identifier (e.g., S-NSSAI) corresponding to the network slice 260 that is to be created. The slice creation request may further indicate a source address, a destination address, and network path constraints such as performance commitments (e.g., SLA, SLO, SLE, SLI) specified for the network slice 260. The source address may correspond to an ingress transport boundary router (e.g., ingress provider edge (PE) 442) connected to the RAN domain 224. The destination address may correspond to an egress transport boundary router (e.g., egress PE 446) connected to the CN domain 244.

Further, for example, the receiving at block 902 may be performed to initiate the creation of a network slice that is associated with a slice identifier that may be used to monitor performance and/or status of the transport domain portion of the network slice.

At block 704 of FIG. 7, the method 700 may include searching a transport slice mapping database for at least one mapping entry corresponding to the global identifier. For example, in an embodiment, the device 100, the transport slice identification component 180, and/or the searching component 620 may be configured to or may comprise means for searching a transport slice mapping database 420 for at least one mapping entry corresponding to the global identifier.

For example, the searching at block 704 may include determining whether the global identifier S-NSSAI indicated by the slice creation request is a unique S-NSSAI or whether the S-NSSAI is a common S-NSSAI, as described above in reference to FIGS. 4 and 5.

In some embodiments, if or when the search results indicate that the global identifier S-NSSAI was not found in the transport slice mapping database 420, the searching at block 704 may determine that the global identifier S-NSSAI indicated by the slice creation request is a unique S-NSSAI.

In other optional or additional embodiments, if or when the search results indicate that the global identifier S-NSSAI was found in the transport slice mapping database 420, the searching at block 704 may determining that the global identifier S-NSSAI indicated by the slice creation request is a common S-NSSAI.

Further, for example, the searching at block 704 may be performed to determine whether the network slice 260 corresponding to the global identifier S-NSSAI indicated by the first slice creation request already has assigned transport network resources. Such a determination is needed to determine a method by which the unique transport slice identifier is to be generated.

At block 706 of FIG. 7, the method 700 may include generating, based on determining that the at least one mapping entry was not found, a first transport slice identifier corresponding to the network slice. For example, in an embodiment, the device 100, the transport slice identification component 180, and/or the generating component 630 may be configured to or may comprise means for generating, based on determining that the at least one mapping entry was not found, a first transport slice identifier 415 corresponding to the network slice 260.

For example, the generating at block 706 may include generating the first transport slice identifier based at least on a source address indicated by the first slice creation request, a destination address indicated by the first slice creation request, and network path constraints indicated by the first slice creation request, as described above in reference to FIGS. 4 and 5.

Further, for example, the generating at block 706 may be performed to generate a unique transport slice identifier, based at least on the global identifier S-NSSAI, that may be used to monitor status and/or performance of the network slice 260 within the transport network domain 234. As a result, a performance monitoring system may perform end-to-end monitoring of network slice performance, as well as, visualizations of the transport network paths. Thus, allowing for fault detection and isolation at an individual network slice and/or transport flow level.

In optional or additional embodiments, the generating at block 706 may include generating the second transport slice identifier based at least on a source address indicated by the second slice creation request and a destination address indicated by the second slice creation request.

At block 708 of FIG. 7, the method 700 may include adding a first mapping entry to the transport slice mapping database indicating a first relationship between the global identifier and the first transport slice identifier. For example, in an embodiment, the device 100, the transport slice identification component 180, and/or the adding component 640 may be configured to or may comprise means for adding a first mapping entry to the transport slice mapping database 420 indicating a first relationship between the global identifier and the first transport slice identifier 415.

For example, the adding at block 708 may include adding a mapping entry to the transport slice mapping database 420 indicating a relationship between the global identifier S-NSSAI indicated by the slice creation request and the TN-SliceID 415, as described above in reference to FIGS. 4 and 5.

Further, for example, the adding at block 708 may be performed to store and maintain the mapping information between the global identifier S-NSSAI of the network slice 260 and the transport slice identifier 415.

At block 710 of FIG. 7, the method 700 may include adding a second mapping entry to a transport slice path mapping database indicating a second relationship between the first transport slice identifier and a first network path identifier of a first network path assigned to the network slice. For example, in an embodiment, the device 100, the transport slice identification component 180, and/or the adding component 640 may be configured to or may comprise means for adding a second mapping entry to a transport slice path mapping database 430 indicating a second relationship between the first transport slice identifier 415 and a first network path identifier of a first network path assigned to the network slice 260.

For example, the adding at block 710 may include adding a mapping entry to a transport slice path mapping database 430 indicating a relationship between the TN-SliceID 415 and a network path identifier of a transport network path assigned to the network slice 260, as described above in reference to FIGS. 4 and 5. For example, the network path identifier may correspond to an entry in a segment routing IPv6 (SRv6) transport element database (SRv6TE-DB) that defines the configuration of the transport network path assigned to the network slice 260.

Further, for example, the adding at block 710 may be performed to store and maintain the mapping information between the TN-SliceID 415 and a network path identifier of a transport network path assigned to the network slice 260.

At block 712 of FIG. 7, the method 700 may include publishing, to a performance monitoring system (PMS), the first mapping entry and the second mapping entry. For example, in an embodiment, the device 100, the transport slice identification component 180, and/or the publishing component 650 may be configured to or may comprise means for publishing, to PMS 450, the first mapping entry and the second mapping entry.

For example, the publishing at block 712 may include publishing, to the PMS 450, the mapping indicating the correspondence between the global identifier S-NSSAI indicated by the slice creation request and the TN-SliceID 415, and the mapping indicating the correspondence between the TN-SliceID 415 and the network path identifier of a transport network path assigned to the network slice 260, as described above in reference to FIGS. 4 and 5.

In some embodiments, the publishing at block 712 may include advertising the transport slice mapping database 420 and the transport slice path mapping database 430 to provide the mappings between the S-NSSAI, the TN-SliceID 415, and the SRv6TE-DB to the PMS 450. In other optional or additional embodiments, the mapping information may be published and/or provided to the PMS 450 via a REST-API.

Further, for example, the publishing at block 712 may be performed to provide information to the PMS 450 that may be used to monitor status and/or performance of the network slice 260 within the transport network domain 234. As a result, a performance monitoring system may perform end-to-end monitoring of network slice performance, as well as, visualizations of the transport network paths. Thus, allowing for fault detection and isolation at an individual network slice and/or transport flow level.

In optional or additional embodiments that may be combined with any other embodiment, the method 700 may include regenerating the first transport slice identifier based on determining that at least one of the source address, the destination address, and the network path constraints has changed, to obtain a regenerated first transport slice identifier. The method 700 may further include updating the first mapping entry with the regenerated first transport slice identifier to obtain an updated first mapping entry. The method 700 may further include updating the second mapping entry with the regenerated first transport slice identifier to obtain an updated second mapping entry. The method 700 may further publishing, to the PMS 450, the updated first mapping entry and the updated second mapping entry.

In optional or additional embodiments that may be combined with any other embodiment, the method 700 may include selecting the first network path assigned to the network slice based at least on a source address indicated by the first slice creation request, a destination address indicated by the first slice creation request, and network path constraints indicated by the first slice creation request. The method 700 may further include assigning the first network path identifier to the first network path assigned to the network slice. The method 700 may further include publishing, to the PMS 450, the first network path identifier of the first network path assigned to the network slice.

In optional or additional embodiments that may be combined with any other embodiment, the method 700 may include receiving, from the controller 330, a second slice creation request. The second slice creation request may comprise the global identifier corresponding to the network slice 260. The method 700 may further include searching the transport slice mapping database 420 for the at least one mapping entry corresponding to the global identifier. The method 700 may further include generating, based on determining that the at least one mapping entry was found, a second transport slice identifier 415 corresponding to the network slice 260. The method 700 may further include adding a third mapping entry to the transport slice mapping database 420 indicating a third relationship between the global identifier and the second transport slice identifier 415. The method 700 may further include adding a fourth mapping entry to the transport slice path mapping database 430 indicating a fourth relationship between the second transport slice identifier 415 and a second network path identifier of a second network path assigned to the network slice. The method 700 may further include publishing, to the PMS 450, the third mapping entry and the fourth mapping entry.

In optional or additional embodiments that may be combined with any other embodiment, the method 700 may include regenerating the second transport slice identifier based on determining that at least one of the source address and the destination address has changed, to obtain a regenerated second transport slice identifier. The method 700 may further include updating the third mapping entry with the regenerated second transport slice identifier to obtain an updated third mapping entry. The method 700 may further include updating the fourth mapping entry with the regenerated second transport slice identifier to obtain an updated fourth mapping entry. The method 700 may further include publishing, to the PMS 450, the updated third mapping entry and the updated fourth mapping entry.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus for identifying network slices in a transport network, comprising:
   a memory storage storing computer-executable instructions; and
   a processor communicatively coupled to the memory storage, wherein the processor is configured to execute the computer-executable instructions and cause the apparatus to:
      receive, from a controller, a first slice creation request to create a network slice, the first slice creation request comprising a global identifier corresponding to the network slice;
      search a transport slice mapping database for at least one mapping entry corresponding to the global identifier;
      generate, based on a determination that the at least one mapping entry was not found, a first transport slice identifier corresponding to the network slice;
      add a first mapping entry to the transport slice mapping database indicating a first relationship between the global identifier and the first transport slice identifier;
      add a second mapping entry to a transport slice path mapping database indicating a second relationship between the first transport slice identifier and a first network path identifier of a first network path assigned to the network slice; and
      publish, to a performance monitoring system (PMS), the first mapping entry and the second mapping entry.

2. The apparatus of claim 1, wherein to generate the first transport slice identifier corresponding to the network slice comprises to generate the first transport slice identifier based at least on a source address indicated by the first slice creation request, a destination address indicated by the first slice creation request, and network path constraints indicated by the first slice creation request.

3. The apparatus of claim 2, wherein the computer-executable instructions further cause the apparatus to:
   regenerate the first transport slice identifier based on a determination that at least one of the source address, the destination address, and the network path constraints has changed, to obtain a regenerated first transport slice identifier;
   update the first mapping entry with the regenerated first transport slice identifier to obtain an updated first mapping entry;
   update the second mapping entry with the regenerated first transport slice identifier to obtain an updated second mapping entry; and
   publish, to the PMS, the updated first mapping entry and the updated second mapping entry.

4. The apparatus of claim 1, wherein the computer-executable instructions further cause the apparatus to:
   select the first network path assigned to the network slice based at least on a source address indicated by the first slice creation request, a destination address indicated by the first slice creation request, and network path constraints indicated by the first slice creation request;
   assign the first network path identifier to the first network path assigned to the network slice; and
   publish, to the PMS, the first network path identifier of the first network path assigned to the network slice.

5. The apparatus of claim 1, wherein the computer-executable instructions further cause the apparatus to:
   receive, from the controller, a second slice creation request, the second slice creation request comprising the global identifier corresponding to the network slice;
   search the transport slice mapping database for the at least one mapping entry corresponding to the global identifier;
   generate, based on a determination that the at least one mapping entry was found, a second transport slice identifier corresponding to the network slice;
   add a third mapping entry to the transport slice mapping database indicating a third relationship between the global identifier and the second transport slice identifier;
   add a fourth mapping entry to the transport slice path mapping database indicating a fourth relationship between the second transport slice identifier and a second network path identifier of a second network path assigned to the network slice; and
   publish, to the PMS, the third mapping entry and the fourth mapping entry.

6. The apparatus of claim 5, wherein to generate the second transport slice identifier corresponding to the network slice comprises to generate the second transport slice identifier based at least on a source address indicated by the second slice creation request and a destination address indicated by the second slice creation request.

7. The apparatus of claim 6, wherein the computer-executable instructions further cause the apparatus to:
   regenerate the second transport slice identifier based on a determination that at least one of the source address and the destination address has changed, to obtain a regenerated second transport slice identifier;
   update the third mapping entry with the regenerated second transport slice identifier to obtain an updated third mapping entry;
   update the fourth mapping entry with the regenerated second transport slice identifier to obtain an updated fourth mapping entry; and
   publish, to the PMS, the updated third mapping entry and the updated fourth mapping entry.

8. The apparatus of claim 1,
   wherein to receive, from the controller, the first slice creation request comprises to receive, from the controller via a first representational state transfer application programming interface (REST-API), the first slice creation request, and
   wherein to publish, to the PMS, the first mapping entry and the second mapping entry comprises to publish, to the PMS via a second REST-API, the first mapping entry and the second mapping entry.

9. A method of identifying network slices in a transport network by a transport network device, comprising:
   receiving, from a controller, a first slice creation request to create a network slice, the first slice creation request comprising a global identifier corresponding to the network slice;
   searching a transport slice mapping database for at least one mapping entry corresponding to the global identifier;
   generating, based on determining that the at least one mapping entry was not found, a first transport slice identifier corresponding to the network slice;
   adding a first mapping entry to the transport slice mapping database indicating a first relationship between the global identifier and the first transport slice identifier;
   adding a second mapping entry to a transport slice path mapping database indicating a second relationship between the first transport slice identifier and a first network path identifier of a first network path assigned to the network slice; and publishing, to a performance monitoring system (PMS), the first mapping entry and the second mapping entry.

10. The method of claim 9, wherein the generating of the first transport slice identifier corresponding to the network slice comprises generating the first transport slice identifier based at least on a source address indicated by the first slice creation request, a destination address indicated by the first slice creation request, and network path constraints indicated by the first slice creation request.

11. The method of claim 10, further comprising:
regenerating the first transport slice identifier based on determining that at least one of the source address, the destination address, and the network path constraints has changed, to obtain a regenerated first transport slice identifier;
updating the first mapping entry with the regenerated first transport slice identifier to obtain an updated first mapping entry;
updating the second mapping entry with the regenerated first transport slice identifier to obtain an updated second mapping entry; and
publishing, to the PMS, the updated first mapping entry and the updated second mapping entry.

12. The method of claim 9, further comprising:
selecting the first network path assigned to the network slice based at least on a source address indicated by the first slice creation request, a destination address indicated by the first slice creation request, and network path constraints indicated by the first slice creation request;
assigning the first network path identifier to the first network path assigned to the network slice; and
publishing, to the PMS, the first network path identifier of the first network path assigned to the network slice.

13. The method of claim 9, further comprising:
receiving, from the controller, a second slice creation request, the second slice creation request comprising the global identifier corresponding to the network slice;
searching the transport slice mapping database for the at least one mapping entry corresponding to the global identifier;
generating, based on determining that the at least one mapping entry was found, a second transport slice identifier corresponding to the network slice;
adding a third mapping entry to the transport slice mapping database indicating a third relationship between the global identifier and the second transport slice identifier;
adding a fourth mapping entry to the transport slice path mapping database indicating a fourth relationship between the second transport slice identifier and a second network path identifier of a second network path assigned to the network slice; and
publishing, to the PMS, the third mapping entry and the fourth mapping entry.

14. The method of claim 13, wherein the generating of the second transport slice identifier corresponding to the network slice comprises generating the second transport slice identifier based at least on a source address indicated by the second slice creation request and a destination address indicated by the second slice creation request.

15. The method of claim 14, further comprising:
regenerating the second transport slice identifier based on determining that at least one of the source address and the destination address has changed, to obtain a regenerated second transport slice identifier;
updating the third mapping entry with the regenerated second transport slice identifier to obtain an updated third mapping entry;
updating the fourth mapping entry with the regenerated second transport slice identifier to obtain an updated fourth mapping entry; and
publishing, to the PMS, the updated third mapping entry and the updated fourth mapping entry.

16. The method of claim 9, wherein,
the receiving, from the controller, of the first slice creation request comprises receiving, from the controller via a first representational state transfer application programming interface (REST-API), the first slice creation request, and
the publishing, to the PMS, of the first mapping entry and the second mapping entry comprises publishing, to the PMS via a second REST-API, the first mapping entry and the second mapping entry.

17. A non-transitory computer-readable storage medium having recorded thereon a program for identifying network slices in a transport network by an apparatus, the program comprising operations to:
receive, from a controller, a first slice creation request to create a network slice, the first slice creation request comprising a global identifier corresponding to the network slice;
search a transport slice mapping database for at least one mapping entry corresponding to the global identifier;
generate, based on a determination that the at least one mapping entry was not found, a first transport slice identifier corresponding to the network slice;
add a first mapping entry to the transport slice mapping database indicating a first relationship between the global identifier and the first transport slice identifier;
add a second mapping entry to a transport slice path mapping database indicating a second relationship between the first transport slice identifier and a first network path identifier of a first network path assigned to the network slice; and
publish, to a performance monitoring system (PMS), the first mapping entry and the second mapping entry.

18. The non-transitory computer-readable storage medium of claim 17, wherein the operations to generate the first transport slice identifier corresponding to the network slice comprises to generate the first transport slice identifier based at least on a source address indicated by the first slice creation request, a destination address indicated by the first slice creation request, and network path constraints indicated by the first slice creation request.

19. The non-transitory computer-readable storage medium of claim 17, wherein the program comprises further operations to:
receive, from the controller, a second slice creation request, the second slice creation request comprising the global identifier corresponding to the network slice;
search the transport slice mapping database for the at least one mapping entry corresponding to the global identifier;
generate, based on a determination that the at least one mapping entry was found, a second transport slice identifier corresponding to the network slice;
add a third mapping entry to the transport slice mapping database indicating a third relationship between the global identifier and the second transport slice identifier;

add a fourth mapping entry to the transport slice path mapping database indicating a fourth relationship between the second transport slice identifier and a second network path identifier of a second network path assigned to the network slice; and publish, to the PMS, the third mapping entry and the fourth mapping entry.

20. The non-transitory computer-readable storage medium of claim 19, wherein the operations to generate the second transport slice identifier corresponding to the network slice comprises to generate the second transport slice identifier based at least on a source address indicated by the second slice creation request and a destination address indicated by the second slice creation request.

* * * * *